US009384062B2

(12) United States Patent
Tan (10) Patent No.: US 9,384,062 B2
(45) Date of Patent: Jul. 5, 2016

(54) ARTIFICIAL NEURAL NETWORK FOR BALANCING WORKLOAD BY MIGRATING COMPUTING TASKS ACROSS HOSTS

(75) Inventor: Tzu-Chin Tan, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1475 days.

(21) Appl. No.: 12/344,463

(22) Filed: Dec. 27, 2008

(65) Prior Publication Data
US 2010/0169253 A1     Jul. 1, 2010

(51) Int. Cl.
G06N 5/00      (2006.01)
G06F 1/00      (2006.01)
G06F 9/50      (2006.01)

(52) U.S. Cl.
CPC ...... *G06F 9/5088* (2013.01); *G06F 2209/5019* (2013.01)

(58) Field of Classification Search
CPC ............. G06N 3/08; G06N 3/02; G06N 5/04; G06N 5/02
USPC ......................................................... 706/21
See application file for complete search history.

(56) References Cited

U.S. PATENT DOCUMENTS

| 2006/0106938 | A1* | 5/2006  | Dini et al. ..................... 709/228 |
| 2007/0280255 | A1* | 12/2007 | Tsang et al. ................ 370/395.2 |
| 2008/0222646 | A1* | 9/2008  | Sigal et al. .................... 718/105 |
| 2012/0189071 | A1* | 7/2012  | Goller et al. .................. 375/260 |

OTHER PUBLICATIONS

Tan, Tzu-Chin: "Real-Time Tasks Scheduling Using Artificial Neural Networks", Slides of a talk given Spring 1995 representing Ph.D. Thesis, Department of Electrical and Computer Engineering SUNY at Buffalo, 13 pages.

* cited by examiner

*Primary Examiner* — Stanley K Hill
*Assistant Examiner* — Kalpana Bharadwaj (57) ABSTRACT

Methods and apparatuses for balancing computing workload via migrating computing tasks are disclosed. An artificial neural network (ANN) is trained based on the workload distribution over time for a host. The ANN predicts the workload for the host, and an indication may be sent to migrate at least one computing task away from the host. The indication is sent when the method is operating in a proactive mode and when the predicted workload is outside of a desired operating range. Some embodiments monitor the workload; and automatically switch the method to the proactive mode, when a difference between the monitored workload and the predicted workload is small. Other embodiments monitor the workload; and automatically switch the method to a reactive mode, when the monitored workload is outside of a failsafe operating range for the particular host.

35 Claims, 8 Drawing Sheets

ARTIFICIAL NEURAL NETWORK FOR BALANCING WORKLOAD BY MIGRATING COMPUTING TASKS ACROSS HOSTS

BACKGROUND OF THE INVENTION

When a host executes a typical computer program (also known as an application), the application starts one or more computing tasks. At times, it is desirable to migrate such computing tasks to another host for any one of a number of reasons. One such reason is that the source host (otherwise known as a first host, i.e., a host which will become the source of the migration) may currently be overburdened with too many computing tasks. Another such reason is that the source host may be overburdened with even just a few computing tasks that consume substantial resources. Yet another such reason is that it may be desirable to shut down the source host, either for maintenance or because it is only lightly used at the moment—a result of which is that power can be saved by consolidating the current computing workload on fewer hosts.

Blade servers are examples of systems in which a number of servers (also known as blades or hosts) share resources including disk storage systems, network and input/output (IO) access, power, and cooling. The processors and main memory within each blade may be largely or totally interchangeable with those on the other blades. Blade servers are currently popular, due to their cost effectiveness for a variety of computing tasks applied to many types of applications. The current popularity of blade servers is only one of the reasons to provide effective mechanisms to migrate computing tasks among compatible hosts.

A manual approach for migrating a computing task includes: i) the user of the program stopping its execution on the source host; ii) the user or the program automatically saving the current program execution state to one or more files on a disk shared by both the source host and the destination host; and iii) starting execution of the program on the destination host. One drawback of this approach is that each migration requires manual intervention. Another drawback is that not all programs include features that allow the user to stop execution and save enough information on the state of the program to disk files.

Automatic approaches for migrating a computing task include, but are not limited to, virtualization. Virtualization has become popular for a variety of reasons. One common use of virtualization is for host consolidation. Virtualization allows underutilized hosts (i.e., physical machines) to be consolidated onto a single host (i.e. a single physical machine).

In a typical virtualization scheme, a particular instance of an operating system and all of the applications that operating system executes form a virtual machine (VM). Thus, computing tasks may be encapsulated as part of a VM. A single host may execute multiple VMs. Typically, each VM is unaware of the other VMs on the same host, each VM usually has no access to information about other VMs on the same host, and no VM can affect the operation of any other VM on the same host.

A VM can be migrated from a source host to a destination host automatically. While a VM may not need to be halted to migrate, its performance may be reduced for a period of time during which the migration is in process. Further, the performance of other computing tasks on both the source host and the destination host may be adversely impacted, particularly in the case where the decision was made to migrate the VM because the source host currently has a high computing workload. Migrating a VM can require half a minute to several minutes to complete. See M. Nelson, B-H Lim, and G. Hutchins, "Fast Transparent Migration for Virtual Machines," Proceedings of USENIX '05 (General Track) Apr. 10-15, 2005.

Figure 1:
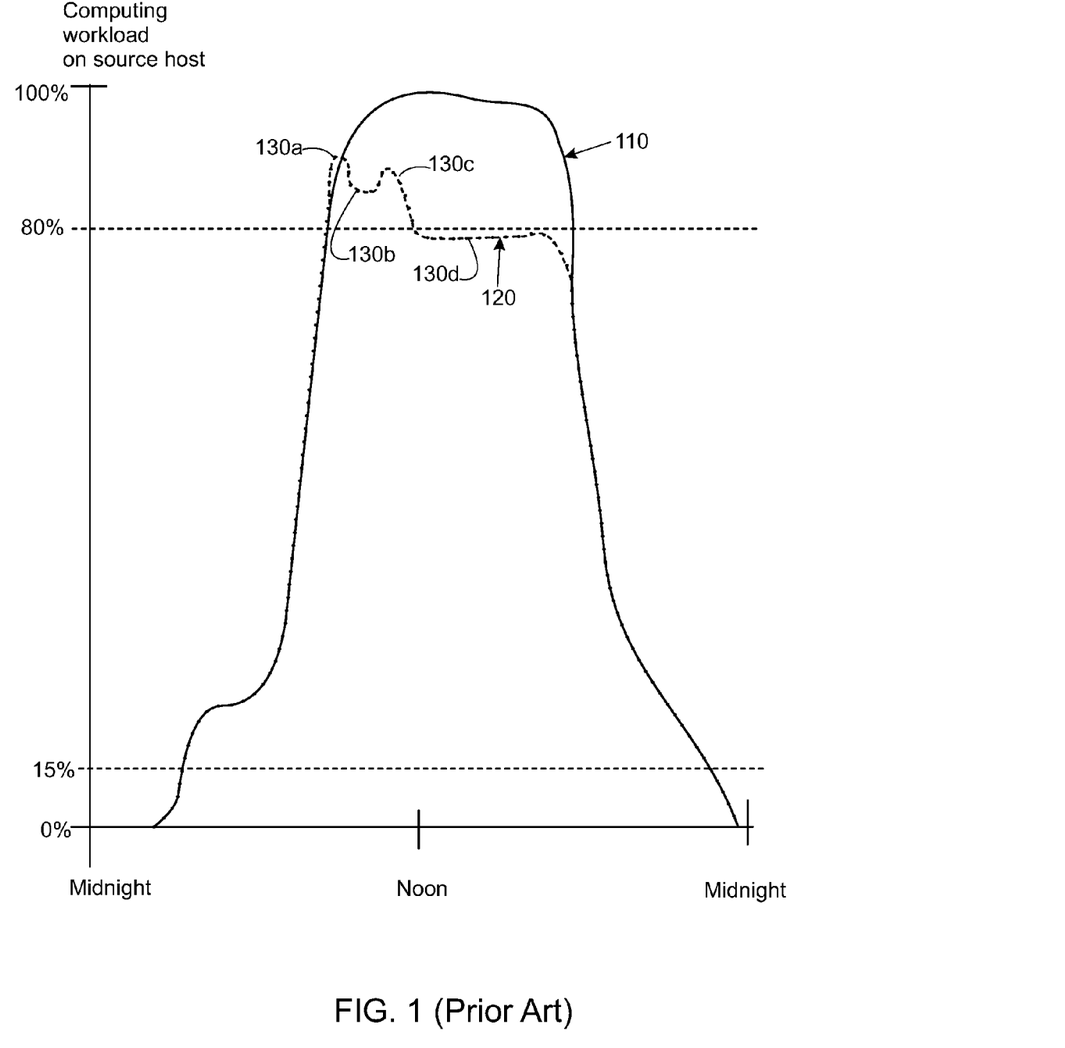
FIG. 1 is a plot illustrating how computing workload changes over time, as known in the prior art, for a host with computing tasks that can be migrated to another host.

FIG. 1 is a plot illustrating how computing workload changes over time, as known in the prior art, for a source host with computing tasks that can be migrated to another host. The computing workload is represented on the Y axis and ranges from 0% to 100% of the computing capacity of the source host. Time is represented on the X axis. Time ranges through a 24 hour period, that is, midnight to midnight.

Plot line 110 shows the computing workload on the source host assuming that no computing tasks are migrated away from the source host. As plot line 110 shows, there is essentially no computing workload on this host for the first few hours of the day. Starting around mid-morning the computing workload exceeds 80%. By late morning, the workload has maxed out around 100%. In the later part of the afternoon, the workload declines to below 80% and in the late evening it declines to below 15%.

Plot line 120 shows the computing workload on the source host assuming that a number of computing tasks are migrated away from the source host to a destination host when the computing workload exceeds a threshold of 80%. This migration can be done using VM technology.

Plot line 120 assumes that the source host initiates computing task migration as soon as its measured computing workload exceeds 80%. The migration process forces the computing workload on the source host to go even higher due to the resources the migration consumes on the source host. That is, there is a period of time during which peak 130a of plot line 120 is higher than plot line 110.

When a first set of computing tasks has been migrated away from the source host then plot line 120 lowers, peak 130a ends, and plot line 120 forms trough 130b. However, in trough 130b, the computing workload measured on the source host is still above 80%. Thus, the source host decides to migrate a second set of computing tasks.

This second migration results in peak 130c in plot line 120. When the second set of computing tasks has been migrated away from the source host, then plot line 120 again lowers, peak 130c ends, and plot line 120 forms plateau 130d. In plateau 130d, the measured workload is below 80%, and thus no further migrations are needed.

FIG. 1 illustrates a limitation of the above mentioned prior art approaches. There may be a period of time during which the computing workload is above the maximum utilization target of 80%. For example as shown in FIG. 1, plot line 120 exceeds 80% during peak 130a, trough 130b, and peak 130c.

Another limitation of the above mentioned prior art approaches is that they may trigger unnecessary migrations. An actual computing workload is very unlikely to be a smooth curve, as shown by plot lines 110 and 120. Rather an actual computing workload would likely include a jagged random offset to the plot lines as shown. Because of this, a temporary spike in computing workload may trigger a migration of computing tasks; however, if the spike is short enough more computing workload may be consumed by the migration process executing on the source host and the destination host than would be consumed by the temporary spike itself.

SUMMARY OF THE INVENTION

One or more embodiments of the present invention are computer-implemented methods and apparatus for balancing a computing workload adapted for use with at least two hosts that are configured to migrate computing tasks among themselves.

In accordance with one or more such embodiments, there is a system for: training a first artificial neural network (ANN); using the first ANN to predict a workload (i.e., the predicted workload) for a particular one of a number of hosts; and sending an indication to at least one of the hosts to migrate at least one of a number of computing tasks away from the particular host. In accordance with one or more such embodiments, training data for the ANN is based on a distribution over time of a computing workload for the particular host. In accordance with one or more such embodiments, the indication is sent when the system is operating in a proactive mode and when the predicted workload is outside of a proactive operating range for the particular host.

Some embodiments include: monitoring the computing workload for the particular host; and automatically switching to the proactive mode when a difference between the monitored workload and the predicted workload is less than an autostart accuracy threshold. Other embodiments include monitoring the computing workload for the particular host; and automatically switching to a reactive mode when the monitored computing workload is outside of a failsafe operating range for the particular host. When in the reactive mode, the migration indication is sent based on the monitored workload.

DETAILED DESCRIPTION

Figure 2:
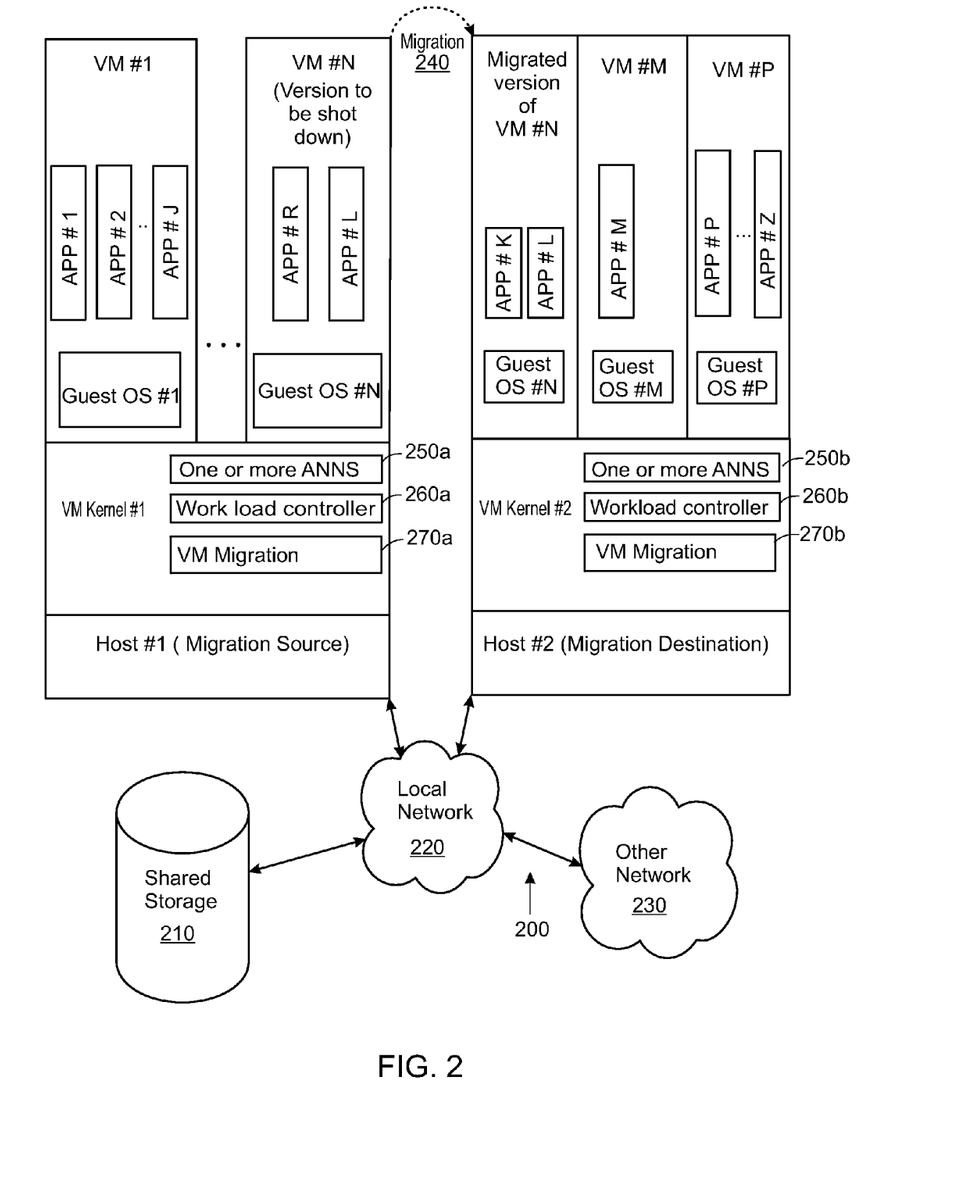
FIG. 2 shows a functional hardware and software configuration, according to an embodiment, of a multi-host virtual machine (VM) system that supports VM migration for workload balancing.

FIG. 2 shows a functional hardware and software configuration, according to an embodiment, of multi-host virtual machine (VM) system 200. System 200 includes five hardware components: host #1; host #2; shared storage 210; local network 220; and other networks 230. As used herein, "host" is a generic term that includes, but is not limited to: a computing device, a server, a client, or a personal computer (PC).

Host #1 and host #2 each execute a single instance of a layer of virtualization support software, which is called herein a "VM kernel." The VM kernel supports the execution of virtual machines (VMs such as, for example, VM #1) that run guest operating systems (GOSs) and applications. Each VM kernel that is in system 200 as shown in FIG. 2 includes: at least one artificial neural network (ANN) 250; a workload controller 260; and a VM migration engine 270.

Multiple VMs can execute on a single host supported by the VM kernel executing on that host. In the embodiment shown in FIG. 2, i.e., VM system 200, each VM includes a single instance of a GOS, and each GOS supports the execution of one or more applications. A particular VM includes a particular GOS and all of the applications being executed on that GOS.

In VM system 200, local network 220 has a direct hardware connection to each of host #1, host #2, shared storage 210, and other networks 230. Also, host #1, host #2, shared storage 210, and other networks 230 communicate with each other via local network 220. Also, local network 220 provides a high speed connection among host #°, host #2, and shared storage 210. Also, other networks 230 are accessible to host #1 and host #2 via local network 220.

Each application communicates to the GOS that supports that application via known mechanisms that include, but are not limited to, application programming interfaces. The GOSs are generally unaware that they are running on a VM kernel, but they communicate with the VM kernel each time they attempt to perform an activity that is restricted to the VM kernels, an input/output (IO) operation for example. Each VM kernel communicates with the host that supports it via known mechanisms including, but not limited to, issuing 10 commands and setting machine specific registers (MSRs).

Each particular GOS and the applications that it executes form a particular VM. A VM can be thought of as a virtual hardware platform including processors, memory, and devices. The virtual hardware platform is an abstraction that is largely independent of the underlying physical hardware. Thus a virtual machine can be configured identically even on different physical machines, although in some embodiments, processor features are passed through to the VM. Such embodiments support VMs taking advantage of faster and more sophisticated processors.

Each VM kernel is responsible for managing the resources of the physical hardware being used by the VMs that are supported by that VM kernel so as to enhance the performance and scalability of those VMs and to enhance the utilization of that physical hardware. The VM kernels schedule each of their VMs and allocate and manage the resources they need.

Host #1 and host #2 execute VM kernel #1 and VM kernel #2, respectively. VM kernel #1 includes: one or more ANNs 250a; workload controller 260a; and VM migration engine 270a. Guest operating systems (GOS) #1 to #N execute on top of VM kernel #1. These GOSs form the lowest level within VM #1 to #N, respectively. GOS #1 executes application #1 to application #J. GOS #N executes applications #K and #L. Thus, host #1 is currently being shared by N VMs, each of which has its own GOS associated with it, and each GOS is executing some number of applications.

VM kernel #2 includes: one or more ANNs 250b; workload controller 260b; and VM migration engine 270b. Guest operating systems (GOS) #M and #P execute on top of VM kernel #2. These GOSs form the lowest level within VM #M and #P, respectively. GOS #M executes application #M. GOS #P runs applications #P to #Z. Host #2 is currently shared by 2 active VMs, each of which has its own GOS associated with it, and each GOS is executing some number of applications. Host #2 is also currently shared by the migrated version of VM #N, which however is not yet executing at the point in time shown in FIG. 2.

The embodiment shown in FIG. 2, i.e., system 200, performs a VM migration process (indentified as VM migration process 240 in FIG. 2) for workload balancing. In the example shown in FIG. 2, host #1 is the migration source for VM migration process 240, and host #2 is the migration destination for VM migration process 240. During VM migration process 240, there are temporarily 2 instances of VM number #N: the version on host #1 which is to be shut down, and the migrated version on host #2, which is to be started up.

VM migration process 240 is shown in FIG. 2 as a dashed arrow between the two instances of VM #N. However, all communication actually occurs between VM migration engine 270a in VM kernel #1 and VM migration engine 270b in VM kernel #2. At the hardware level, this communication goes to and from the VM kernels via: host #1; local network 220; and host #2. The computing task migration process, both for VM based embodiments and for other embodiments, is further described herein with reference to FIG. 8.

In some embodiments, host #1 and host #2 are blade servers based on an x86 microprocessor. In various embodiments, shared storage 210 is any combination of a storage area network (SAN) device; a network attached storage (NAS) device; or other mass storage devices that are capable of supporting multiple hosts.

Some embodiments are used in a system that includes one or more hosts for which the VM kernels on those hosts do not include an ANN or a workload controller. In such embodiments, the present invention is used for some hosts within the system but not for those hosts without an ANN or a workload controller. In other embodiments, an ANN and workload controller operate on a first host according to the present invention but handle workload prediction and proactive migration of computing tasks for one or more hosts in addition to the first host.

In various embodiments, a typical GOS could be a version of MICROSOFT® WINDOWS®, a version of Linux, or a version of FREEBSD®. In some embodiments, a single VM kernel can support multiple types of GOSs executing at the same time.

As shown and described relative to various figures herein, the multi-host VM system 200 predicts the workload on a host so that migration of computing tasks can be initiated on a proactive basis. In particular, it is desirable that any needed migration begin early enough that the computing workload required to perform the migration does not compound any workload problem there might be on the source host.

Unlike the embodiment of system 200 as shown in FIG. 2, some embodiments use computing task migration techniques that are not based on virtual machines. The academic work on migrating computing tasks includes, but is not limited to: S. Osman, D. Subhraveti, G. Su, and J. Nieh. "The Design and Implementation of Zap: A System for Migrating Computing Environments," Proc. Of the 5th Operating Systems Design and Implementation, December 2002.

Figure 3:
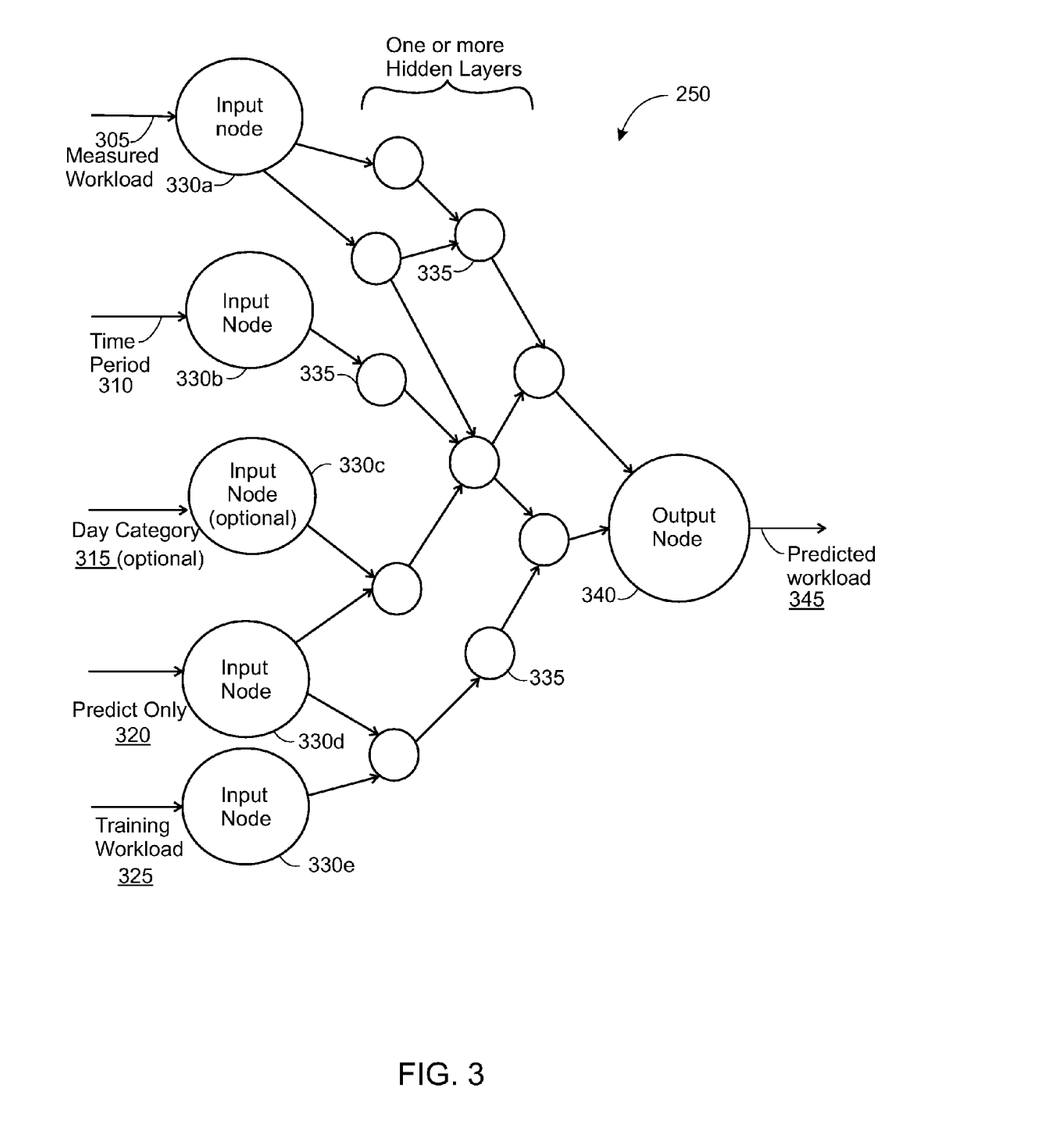
FIG. 3 shows a functional diagram of an artificial neural network (ANN) according to an embodiment.

FIG. 3 shows a functional diagram of artificial neural network (ANN) 250 according to an embodiment. ANN 250 includes: 4 or 5 input nodes 330a-e; a number of intermediate nodes 335 organized into one or more hidden layers; and one output node 340. Input node 330c for a day category is optional.

As is known to those skilled in the art, arcs between the nodes 330, 335, and 340 indicate that prediction information generally flows among the nodes in the direction shown by the arcs. In particular, prediction information generally flows from input nodes 330 through one or more hidden layers of intermediate nodes 335, and then from the intermediate nodes 335 of a final hidden layer to output node 340.

As is known to those skilled in the art, an ANN is a network of relatively simple processing elements (also known as neurons or nodes). For example, a particular node might compute $k \cdot A + j \cdot B$, where k and j are weights (also known as parameters) contained in the particular node, and A and B are the output values of two nodes at input arcs of the particular node. Despite employing relatively simple processing elements, an ANN can exhibit quite complex overall behavior, as determined by the connections among the nodes, the values of the parameters within each of the nodes, and the adaptation (also known as back propagation or training) that the ANN receives. The process of training or retraining of an ANN includes adjusting the values of the parameters in each of the nodes.

Input node 330a receives measured workload 305 from other components within the VM kernel or within workload controller 260. In some embodiments, the VM kernel keeps track of workload measurements that are directly suitable for use as measured workload 305. In other embodiments, workload controller 260 requests that the VM kernel track the information needed. In yet other embodiments, workload controller 260 periodically queries the VM kernel for workload measurements and aggregates or otherwise processes these measurements as needed to form measured workload 305.

In some embodiments, measured workload 305 is the average percentage of CPU utilization over the most recently completed 10-minute time period. In various embodiments, the computing workload is selected from a variety of factors, including but not limited to: i) a processor utilization indication; ii) a memory utilization indication; iii) an input output (IO) utilization indication; or iv) any combination, average, or weighted average thereof.

Input node 330b receives time period 310 from other components within the VM kernel. In some embodiments, time period 310 is a count of the 20 minute time periods that have elapsed since midnight.

In some embodiments that use optional input node 330c, it receives day category 315 from other components within the VM kernel. In other embodiments, day category 315 is not used and ANN 250 treats each day of the week equivalently. In yet other embodiments, Monday through Friday are categorized into a first day category and Saturday and Sunday are categorized into a second day category.

In yet other embodiments, multiple ANNs are used, one for each day category but these ANNs do not receive day category 315 as an input. Rather, the day category that applies to the current day is used to select which one of the multiple ANNs is used for the duration of that day.

Input node 330d receives predict-only flag 320 from workload controller 260 (as shown in FIG. 2). When operating in the predict-only mode, ANN 250 does not update its training, i.e. retrain itself. Predict-only mode may be desirable to avoid oscillation, that is repeated periods of retraining. For example, predict-only mode may avoid oscillation if one or more VMs have been migrated off the particular host but it is expected that these same VMs or other VMs that are equivalently resource intensive are likely to be migrated back.

When not in predict-only mode, ANN 250 is in the training/retraining mode. In training/retraining mode, ANN 250 updates the parameters within its nodes, based on its inputs and on the accuracy of its output predictions. These updates are performed according to a specific training methodology.

Some embodiments of the invention use a well known "back propagation" algorithm as the training methodology for the ANN. Back propagation can be summarized as entering a current set of input training values into the input nodes of an ANN, entering a correct or training output value into the output node of the ANN. Then working from the output node back through each previous layer of the ANN, adjusting the parameters of the nodes to obtain the training output value as the value of the output node based on the training input values. The exact algorithm and mathematics used in back propagation are, as known to those skilled in the art, more elaborate than the above summary.

Training/retraining mode may be desirable after the measured workload changes due to changes in the activity level of the VMs on a particular host. Training/retraining mode may also be desirable after the addition of a new VM to a host. Training/retraining mode may also be desirable after one or more VMs have been migrated off a particular host especially: i) when inbound VM migration is not likely; ii) when ANN 250 is further trained to base its predicted workload on whether inbound or outbound VM migration has recently occurred; or iii) when inbound migration occurs and oscillation between training/retraining mode and predict only mode would not occur (or would dampen quickly enough that such oscillation would not cause a significant performance impact).

Input node 330e receives training workload 325 from workload controller 260 (as shown in FIG. 2). ANN 250 is trained by providing it with past data on the workload of a particular host, as this workload varies with the time of day. In some embodiments described above, the day category is also taken into account—either by being a part of the training data, or by having separate sets of training data for separate ANNs for each of the day categories.

Output node 340 generates predicted workload 345 for a particular host based on the information it receives from the intermediate nodes 335 that are within the final hidden layer of the ANN. In some embodiments, predicted workload 345 is the average percentage of CPU utilization that ANN 250 predicts will occur during the current 20 minute time period. In some embodiments, time periods start with time period number 1, which lasts each day from midnight to 12:20 AM, then number 2, which lasts from 12:20 to 12:40 AM, and so on.

If a good set of training data is available, then ANN 250 can be rapidly trained by cycling time period 310, training workload 325, and day category 315 (if used) though some number of days worth of workload measurements. Alternatively or additionally, ANN 250 can more gradually train itself based on measured workload 305.

In some embodiments, ANN 250 retrains itself based on measured workload 305 while simultaneously generating predicted workload 345. In some embodiments that employ such simultaneous retraining and prediction, the accuracy workloads predicted from ANN 250 may be increased, or ANN 250 may be able to adapt itself to changing computing workloads, or both.

In some embodiments, ANN 250 is implemented as shown in FIG. 2, that is, software that is contained within the VM kernel.

In other embodiments, ANN 250 is implemented as a software program (also known as an application) that executes on the particular host for which the ANN predicts the workload. For example, the NeuroSolutions product from NeuroDimension, Inc. of Gainesville, Fla. may implement be used to implement the ANN of an embodiment.

In some embodiments, a 3-layer ANN is used with: three nodes in the first/input layer; 20 nodes in the second/intermediate layer; and one node in the third/output layer. Back propagation is used as the training technique. The three input nodes receive, respectively: the day of the week; the time stamp, and the measured workload, which is expressed as a number ranging from 0.0 to 1.0. The output is the predicted workload, which is also expressed as a number ranging from 0.0 to 1.0.

Figure 4:
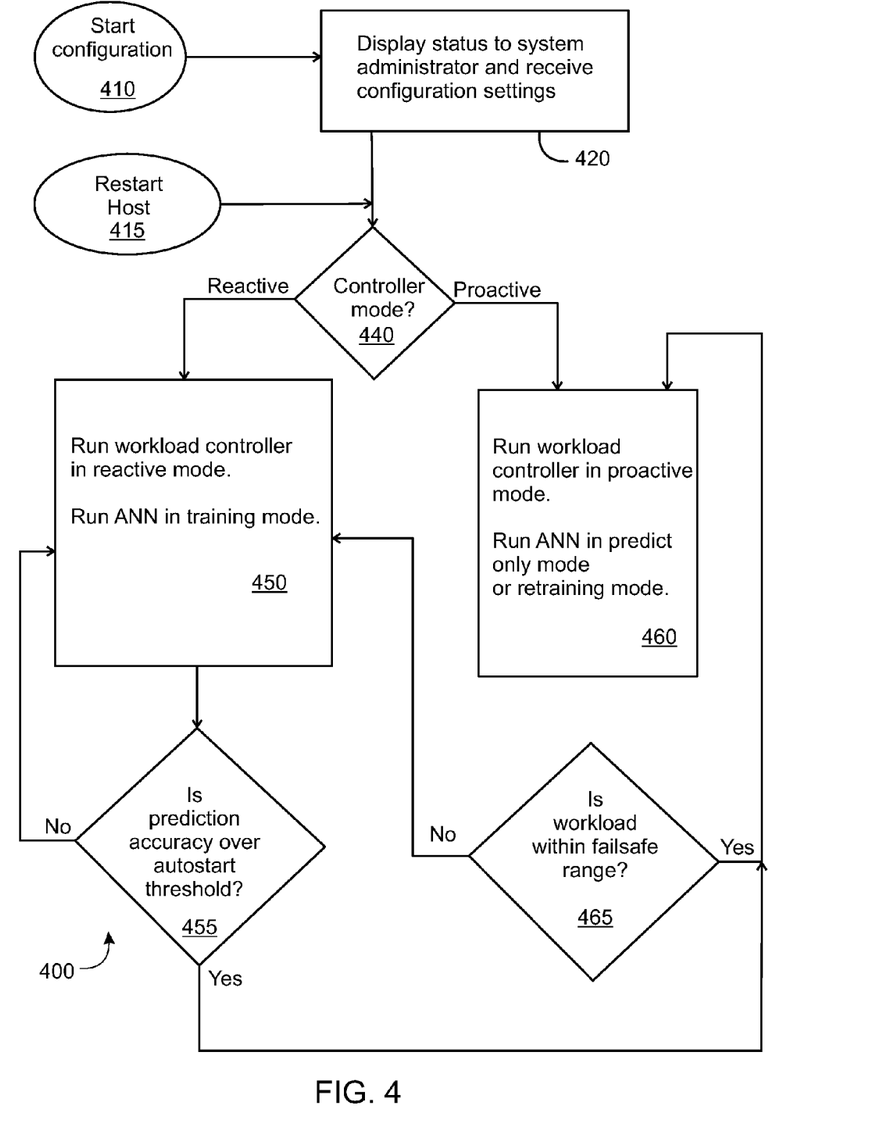
FIG. 4 shows a high-level flow chart, for an embodiment, including the processes of configuring this embodiment, restarting it, and transitioning it between a proactive mode and a reactive mode.

FIG. 4 shows a high-level flow chart for process 400, according to a method of the present invention. Process 400 is performed by workload controller 260 for configuring this embodiment, restarting it, and transitioning it between a proactive mode and a reactive mode. During the reactive mode, workload controller 260 uses measured workload 305 to make migration decisions and process 400 loops between steps 450 and 455. During the proactive mode, workload controller 260 uses predicted workload 345 to make migration decisions and process 400 loops between steps 460 and 465.

At entry point 410, the process of configuring a new ANN, or reconfiguring an existing ANN, starts. Then in step 420, the user sees: i) a set of configuration settings for the method; ii) the monitored workload of the particular host over a period of time; and/or iii) the predicted workload for the particular host over a period of time. Users of process 400 are generally system administrators, responsible for keeping the hosts involved in the migration process up and operating effectively.

In various embodiments, the configuration settings may include, but are not limited to: whether the ANN is training/retraining/or predict only mode; whether the ANN is in the proactive mode or the reactive mode; whether workload controller 260 is in an autostart mode; an accuracy threshold for the autostart mode; whether automatic migration of a particular VM is enabled or disabled; whether a set of two or more VMs must be migrated together whenever any one of them is migrated; a relative priority for migration processes versus other computing tasks; a failsafe operating range; a proactive accuracy range; and a reactive accuracy range.

Step 420 also optionally includes receiving from the user one or more new values for the configuration settings. In embodiments that use day category 315, such commands may apply to a particular category of days, or to all days.

At entry point 415, the process of restarting a host starts. Decision step 440 occurs after the restart process starts at entry point 415, or after step 420. Decision step 440 transfers control to step 450 when workload controller 260 is in the reactive mode. Decision step 440 transfers control to step 460 when workload controller 260 is in the proactive mode.

During step 450, workload controller 260 operates in the reactive mode. In the reactive mode, the predictions of ANN 250 are not used to make migration decisions; rather, the measured workload is used. In the reactive mode, ANN 250 generally operates in training mode, although the current configuration settings may make ANN 250 dormant. The operation of workload controller 260 in the reactive mode is described further herein with respect to FIG. 5.

Periodically during step 450, decision step 455 is performed. Decision step 455 compares the recent history of predicted workloads for the particular host with the measured workload for the corresponding time periods. If ANN 250 has converged, that is, if its training process is far enough along that its predicted workloads are sufficiently accurate, then decision step 455 transfers control to step 460 and thus workload controller 260 automatically enters the proactive mode. In order for this to occur, the user must have enabled autostart and the errors calculated must be less than the autostart accuracy threshold set by the user.

There may be a particular host that has an unpredictable workload. In that case, the training of ANN 250 would not converge and the accuracy of its predictions would not become sufficiently accurate that workload controller 260 ever enters the proactive mode. While this does not allow one or more embodiments of the present invention to be realized for such hosts, they can continue to operate in reactive mode. In some embodiments, ANN 250 disables itself if it does not converge after a training period set by the user. In other embodiments, ANN 250 is disabled by the user when the user decides that training is unlikely to converge. In yet other embodiments, ANN 250 continues to train in case the workload on that host does eventually become predictable.

During step 460, workload controller 260 operates in the proactive mode. In the proactive mode, the predictions of ANN 250 are used to make migration decisions. In the proactive mode, ANN 250 may operate in training/retraining mode or may operate in predict only mode, according to the configuration settings. The operation of workload controller 260 in the proactive mode is described further herein with respect to FIG. 6.

Periodically during step 460, decision step 465 is performed. Decision step 465 compares the measured workload for the particular host with the failsafe thresholds. If the predicted workloads from the ANN have been sufficiently accurate, then the measured workload should lie within the operating range set by the failsafe thresholds. In this case, decision step 465 transfers control to step 460 and thus workload controller 260 stays in the proactive mode.

On the other hand, it is possible that the host is getting too busy or is not staying busy enough and that the predicted workload from ANN 250 has not been accurate enough to correct these effects. In these situations, the failsafe operating range should be exceeded or undershot, in which case decision step 465 automatically transfers control to step 450 and thus workload controller 260 enters the reactive mode. In some embodiments, this advantageously provides a failsafe mode of operation when the accuracy of the ANN falls off. A typical cause of a fall in the accuracy of an ANN is because the workload of the host suddenly changes.

Some embodiments include in step 420 providing a graphical display of the monitored workload of a particular host over a period of time versus the workload predicted by the appropriate ANN for the particular host over the same period of time.

Step 420 may optionally include receiving from the user one or more new values for the configuration settings. The configuration settings may include, but are not limited to, one or more selected from: a command for ANN 250 to enter the training mode; a command for ANN 250 to enter the predict only mode; a command for workload controller 260 to enter the proactive mode; a command for workload controller 260 to enter the reactive mode; a command for workload controller 260 to enter the autostart mode; a command to stay in the current mode; a command to disable automatic migration of a particular VM; a command to require that at least two VMs be migrated together whenever any one of them is migrated; a priority for migration processes versus other computing tasks; a command to set an autostart accuracy threshold; a command to set a failsafe operating range; a command to set a proactive accuracy range; a command to set a reactive accuracy range; a command that applies to a category of days; or a command that applies to all days.

In various embodiments, the steps of process 400 as shown in FIG. 4 may be reordered, combined with each other, and/or altered in other ways, as known to those skilled in the art.

Figure 5:
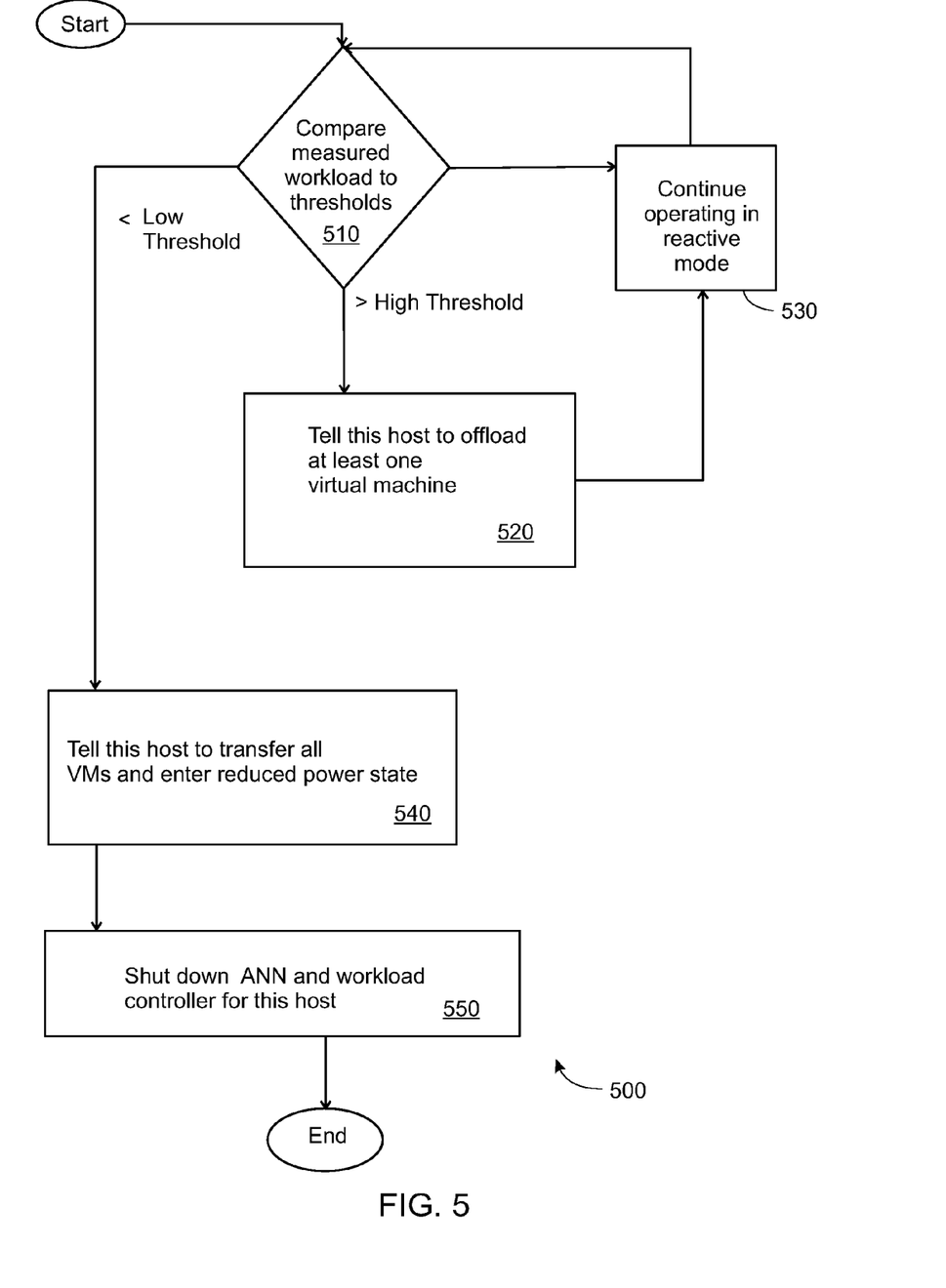
FIG. 5 shows a flow chart, according to an embodiment, of the reactive mode (in contrast to the proactive mode).
Figure 6:
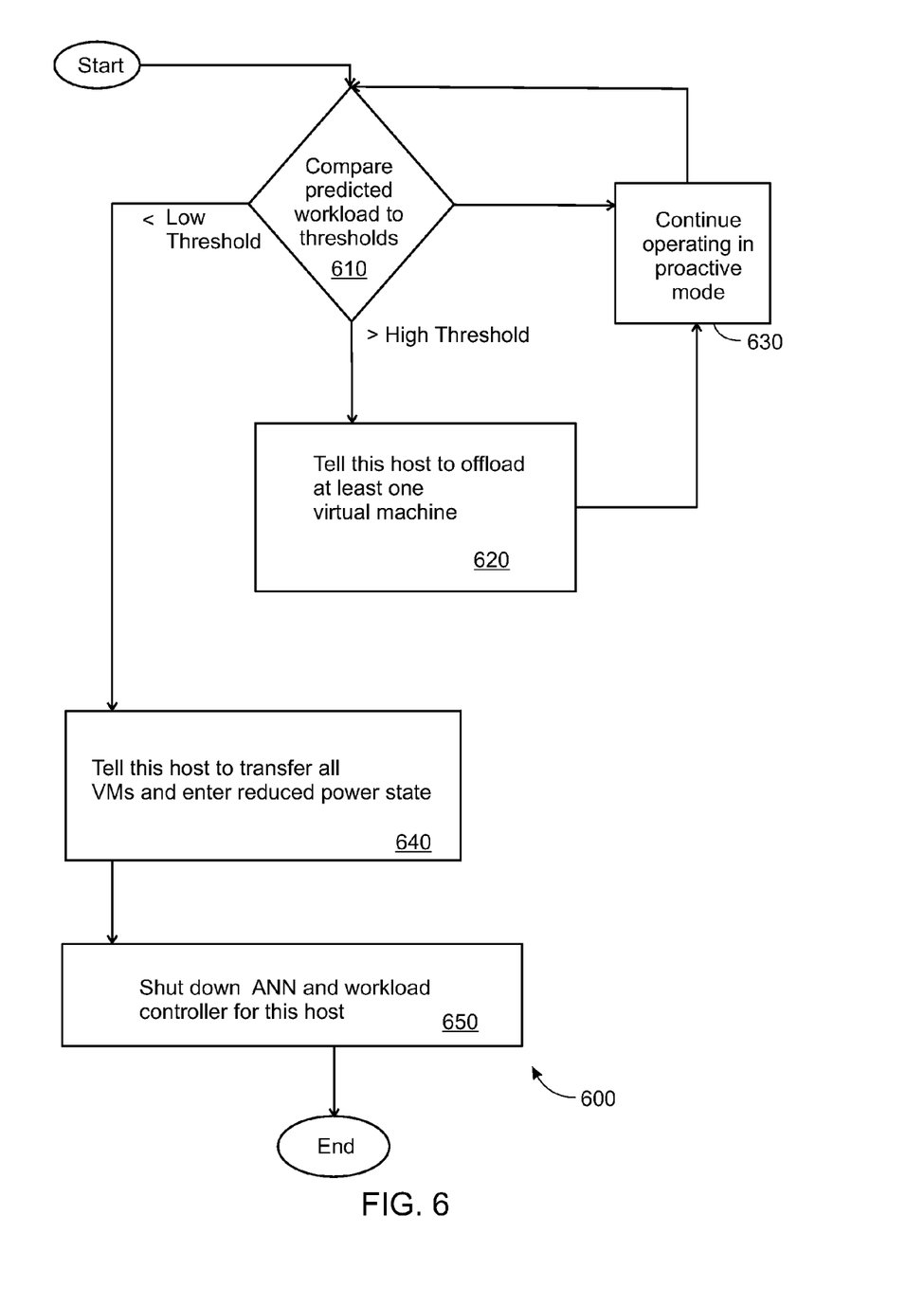
FIG. 6 shows a flow chart, according to an embodiment, of the proactive mode (in contrast to the reactive mode).

FIG. 5 shows a flow chart, according to a method of an embodiment, for process 500, which describes the reactive mode (in contrast to the proactive mode shown in FIG. 6). In the reactive mode, workload controller 260 uses measured workload 305 on the particular host to decide whether or not to migrate one or more VMs away from the particular host so as to keep the computing workload within a reactive operating range. Measured workload 305 is shown in FIG. 3.

During step 530, workload controller 260 operates in the reactive mode. Periodically during step 530, decision step 510 is performed. Decision step 510 compares measured workload 305 for the particular host with a high reactive threshold and with a low reactive threshold.

If measured workload 305 is within the reactive operating range, i.e. if it is between these two thresholds, then control loops back to step 530. If measured workload 305 is greater than the high reactive threshold then control is transferred to step 520. If the measured workload is less than the low reactive threshold then control is transferred to step 540.

In step 520, workload controller 260 sends an indication, including an offload flag, to one or more of the hosts to offload at least one VM from the particular host, which will become the source host for migration process 240. Then control loops back to step 530.

In step 540, workload controller 260 sends an indication, including a reduce power flag, to one or more of the hosts to offload all VMs from the particular host and to put it into a reduced power mode. Then control goes to step 530, during which ANN 250 and workload controller 260 are shut down, or prepare to be shut down as the VM kernel, of which they are a part, is shut down. This ends process 500.

In some embodiments, the reactive mode is used while ANN 250 is initially being trained, or as a failsafe mode to take over when the accuracy of the ANN falls off. Process 500 starts with decision step 510, and typically loops between decision step 510 and step 530.

After workload controller 260 decides to offload one or more VMs executing on a particular host due to a high computing workload on that host, the workload controller must decide which VM(s) are to be migrated. In various embodiments, this decision is constrained or influenced by one or more factors including, but not limited to:

The VM to be migrated should currently be using a substantial amount of the host's resources. In some embodiments, the VM is selected that has the highest VM measured workload. Note that measured workload 305 applies to all VMs on the same particular host, while the VM measured workload relevant to this decision is separately measured for each VM.

There should be a suitable target host for the VM to be migrated—in contrast to, for example, a VM that uses a resource only available on that particular host.

Migrating the VM should not violate any currently active constraints on VM migration. For example in some embodiments, a particular VM may have an attribute that it must stay on its current host, or a set of VMs may have an attribute that they may be migrated only if all VMs within the set are migrated to the same target host.

Random selection among those VMs that are suitable.

Once a VM is chosen to be migrated, a decision must be made as to which host is to be the destination host for this migration. In some embodiments, workload controller 260 of the source host sends, in steps 520 and 540, indications directly to one or more hosts, which respond to the workload controller with information on their current status. Then workload controller 260 of the source host selects the most suitable target host.

In other embodiments, workload controller 260 sends, in steps 520 and 540, the indications to a central system monitor that executes on a particular host within the system, rather than being sent directly to one or more hosts. The central system monitor determines a suitable target host for the VMs to be migrated, and sends the indication on to that host.

In various embodiments, this decision as to a suitable target host is constrained or influenced by one or more factors including, but not limited to:

- The destination host should have access to all virtual disks that are used by the VM. Some embodiments use shared storage 210 (as shown in FIG. 2) or its equivalent. In other embodiments, files within the virtual disks that are used by the VM to be migrated are, as part of the migration process, copied to a storage device that is accessible by the target VM.
- The destination host should have access to the same networks and subnets as the VM to be migrated is using, or that it will require. This ensures that the currently active network connections of the VM stay active and that those network connections needed in the future are available.
- The processor(s) on the destination host should be equivalent with those on the source host at the instruction set architecture (ISA) level. Or, the destination host processor(s) should be upward compatible with those on the source host. For example, the Intel® Pentium® III added streaming SIMD extensions (SSE) instructions and later the Intel® Pentium® 4 added SSE-2 instructions.
- The migration process itself may impose a substantial computational workload both on the source host and the destination host, in terms of CPU resources and network bandwidth. This load should also be considered when selecting the destination host.
- If the goal of this VM migration is to relieve a high computing workload on the source host, then to meet this goal an appropriate quantity of the appropriate types of resources should be available on the target host. In some embodiments, resource availability is determined by the source host communicating with more than one potential target host. In other embodiments, resource availability is determined by the central system monitor, with which the source host communicates with. In response to that communication, the central system monitor selects the target host.
- Random selection among all available hosts, or among those hosts that are suitable.

Unlike the embodiment of process 500 as shown in FIG. 5, some embodiments use computing task migration techniques that are not based on virtual machines. See for example Osman et al. cited herein in the description of FIG. 2. In various embodiments, the steps of process 500 as shown in FIG. 5 may be reordered, combined with each other, and/or altered in other ways, as known to those skilled in the art.

FIG. 6 shows a flow chart, according to a method of an embodiment, for process 600 which describes the proactive mode (in contrast to the reactive mode shown in FIG. 5). In the proactive mode, workload controller 260 uses predicted workload 345 for the particular host to decide whether or not to migrate one or more VMs away from the particular host so as to keep the computing workload within a proactive operating range. Predicted workload 345 is shown in FIG. 3.

During step 630, workload controller 260 operates in the proactive mode. Periodically during step 630, decision step 610 is performed. Decision step 610 compares predicted workload 345 for the particular host with a high proactive threshold and with a low proactive threshold. In contrast, decision step 510 of FIG. 5 uses measured workload 305 instead of predicted workload 345.

If predicted workload 345 is within the proactive operating range, i.e. if it is between these two thresholds, then control loops back to step 630. If measured workload 305 is greater than the high reactive threshold then control is transferred to step 620. If the measured workload is less than the low reactive threshold then control is transferred to step 640.

In step 620, workload controller 260 sends an indication, including an offload flag, to one or more of the hosts to offload at least one VM from the particular host. Then control loops back to step 630.

In step 640, workload controller 260 sends an indication, including a reduce power flag, to one or more of the hosts to offload all computing tasks from the particular host and to put it into a reduced power mode. Then control goes to step 630, during which ANN 250 and workload controller 260 are shut down, or prepare to be shut down as the VM kernel, of which they are a part, is shut down. This ends process 600.

In various embodiments, steps 620 and 640 are performed by various tasks on various hosts within the system, according to various factors. These tasks, hosts, and factors are described herein with respect to FIG. 5.

In the proactive mode and under some operating conditions, the use of predicted workloads by workload controller 260 to decide whether or not to migrate computing tasks advantageously causes such migrations to occur proactively and early.

Unlike the embodiment of process 600 as shown in FIG. 6, some embodiments use computing task migration techniques that are not based on virtual machines. See for example Osman et al. cited herein in the description of FIG. 2.

In various embodiments, the steps of process 600 as shown in FIG. 6 may be reordered, combined with each other, and/or altered in other ways, as known to those skilled in the art.

Figure 7:
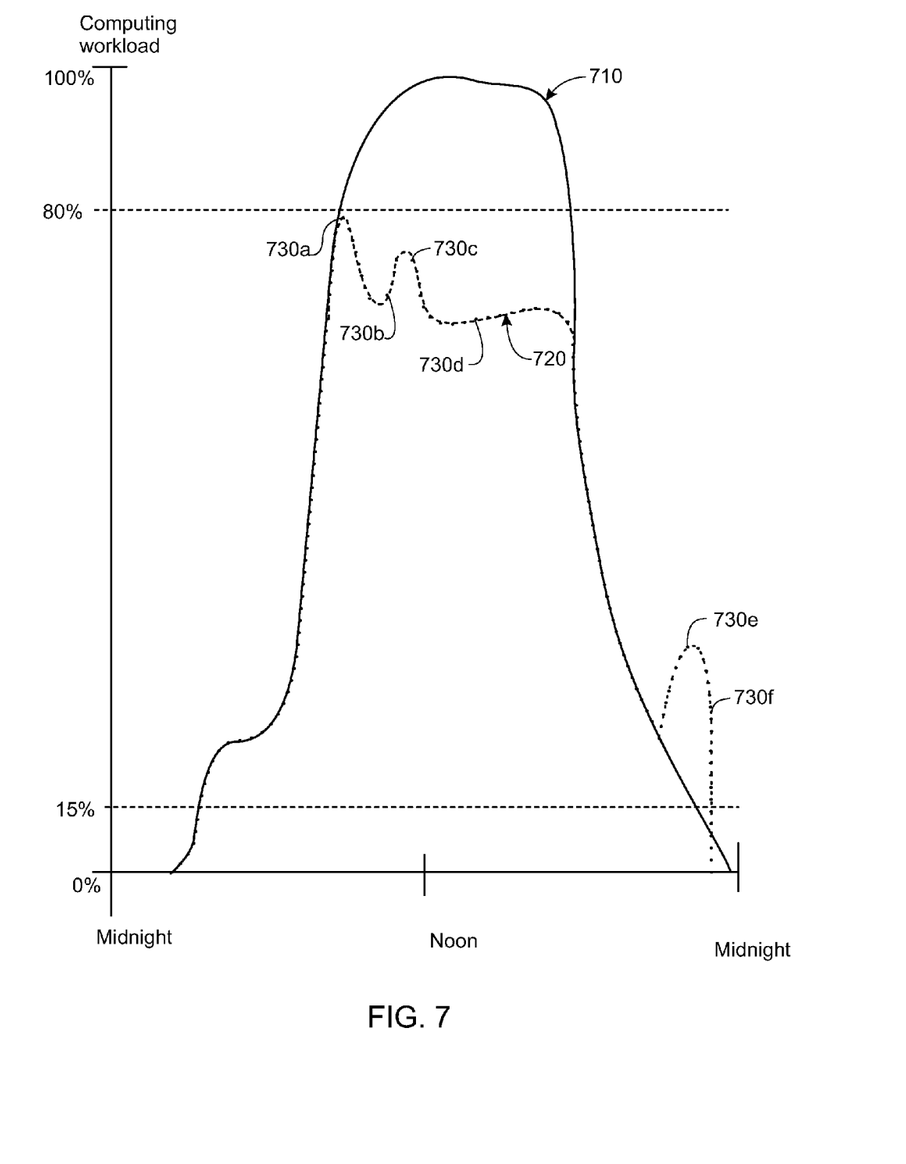
FIG. 7 is a plot of how a computing workload changes over time, according to an embodiment, for a host with computing tasks that can be proactively migrated to another host.

FIG. 7 is a plot of how a computing workload changes over time, according to an embodiment, for a host with computing tasks that can be proactively migrated to another host. The computing workload is given by the Y axis and ranges from 0% to 100% of the computing capacity of the source host. Time is given by the X axis. Time ranges through a 24 hour period, that is, midnight to midnight.

Plot line 710 shows the computing workload on the source host, making the same assumptions as were made for plot line 110 in FIG. 1. Plot line 710 assumes that no computing tasks are migrated away from the source host. As plot line 710 shows, there is essentially no computing workload on this host for the first few hours of the day. Starting around mid-morning the computing workload exceeds 80%. By late morning, the workload has maxed out around 100%. In the later part of the afternoon, the workload declines to below 80% and in the late evening it declines to below 15%.

Plot line 720 shows the computing workload on the source host assuming that a number of computing tasks are proactively migrated away from the source host to a destination host. This migration is assumed to start when the predicted workload exceeds a threshold of 80%, but prior to when the actual workload gets that high.

Plot line 720 shows the computing workload on the source host assuming that the source host initiates computing task migration as soon as its predicted computing workload exceeds 80%. The migration process forces the computing workload of the source host to go even higher due to the resources that the migration consumes on the source host. That is, there is a period of time during which peak 730a of plot line 720 is higher than plot line 710. Nevertheless, due to starting earlier than the similar but reactive process illustrated in FIG. 1, the measured computing workload never exceeds the desired threshold of 80%.

When a first set of computing tasks has been migrated away from the source host then plot line 720 lowers, peak 730*a* ends, and plot line 720 forms trough 730*b*. Plot line 720 shows the computing workload on the source host assuming that during trough 730*b* the predicted workload for the source host is still above 80%. Thus, the source host decides to migrate a second set of computing tasks.

This second migration results in peak 730*c* in plot line 720. When the second set of computing tasks has been migrated away from the source host, then plot line 720 again lowers, peak 730*c* ends, and plot line 720 forms plateau 730*d*. In plateau 730*d*, the measured workload is below 80%, and thus no further migrations are needed.

There is a third migration that results in peak 730*e* in plot line 720. When the predicted workload falls below 15% of the capacity of the source host, a third set of computing tasks is migrated away from the source host. This third set includes all tasks that are currently active on the host, so that the host can be put into a low power state, or shut down completely. At drop 730*f*, plot line 720 goes to zero to enable this power savings.

Figure 8:
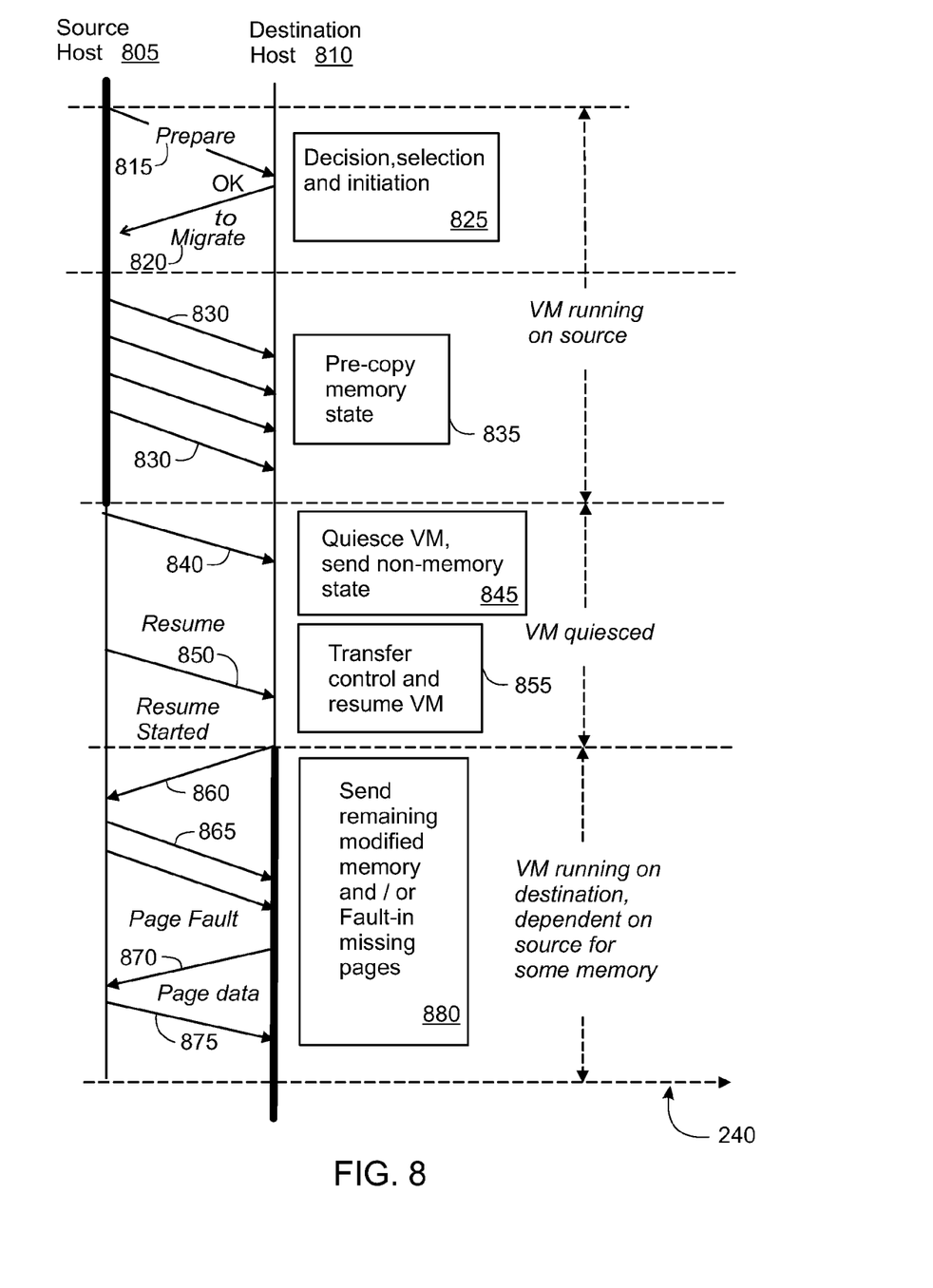
FIG. 8 shows, according to an embodiment, communications back and forth between a source host and a destination host for a VM migration.

FIG. 8 shows, according to an embodiment, communications back and forth between source host 805 and destination host 810 for VM migration process 240 as shown in FIG. 2. VM migration engine 207*a* and VM migration engine 270*b*, as shown in FIG. 2, perform VM migration process 240.

VM migration process 240 involves the following steps: i) decision, selection, and initiation 825; ii) pre-copy memory state 835; iii) quiesce the VM and send the non-memory state 845; iv) transfer control and resume the VM 855; and v) send remaining modified memory and/or fault in missing pages 880. In each VM migration process, these steps occur in the order listed and shown, unless a particular VM migration process is initiated and subsequently aborted.

Step 825 initiates VM migration process 240 by deciding which VM to migrate and selecting the destination host to which this VM is to be migrated. During step 835, source host 805 sends "prepare" message 815 to destination host 810, which replies with "OK to migrate message" 820. During steps 825, the VM being migrated is still executing on source host 805.

After step 825, step 835 pre-copies the memory state of the VM directly from the source host to the destination host. The physical memory of the virtual machine is the largest state component of a virtual machine besides the virtual disks. Proper handling of the physical memory during migration is important for a VM migration that attempts to minimize the impact on the performance and the availability of the VM being migrated. During steps 835, the VM being migrated is still executing on source host 805.

The physical memory is sent while the VM continues to run on the source, which implies a probably iterative process of repeating pre-copy process 830. That is, the first iteration of pre-copy process 830 copies to the destination host the entire physical memory of the VM. Before each physical page is copied, it is marked read-only so that any modifications to the page can be detected by the VM kernel on the source host. When the first iteration of pre-copy process 830 is completed, all of the memory has been copied. However because the VM was executing during the pre-copy process, some memory pages may have been modified after being copied. Thus, pre-copy process 830 is repeated until either the number of modified pages is small enough or until insufficient forward progress has been made. In particular, each iteration of pre-copy process 830 should take less time than the previous iteration. There can be cases where the VM modifies memory faster than it can be transferred, and such cases should be detected and handled as exceptions.

Step 835 may also include other optimizations, such as data compression and/or not sending indications, but not full copies of, memory pages that contain only zeros.

After step 835, step 845 quiesces the execution VM on source host 805, after which the source host sends non-memory state information 840 to destination host 810. Non-memory state information 840 includes, but is not limited to: i) the virtual device state including the state of the processor, the motherboard, network adapters, disk adapters, serial ports, floppy disks, and the super video graphics array (SVGA) or other video information; ii) the external connection state with devices including networks, universal serial bus (USB) devices, small computer system interface (SCSI) devices; and iii) the external connection state with removable media such as floppies, compact disk read only memories (CD-ROMs), and digital versatile disks (DVDs). Non-memory state information 840 for a typical VM may be less than 5 megabytes, with the largest of that being the SVGA frame buffer.

After step 845, step 855 transfers control of the VM to the destination host and resumes execution of the VM thereon. It is important that the same VM never be executing on two hosts at the same time. Thus when the migration is completed, the source host sends "resume" message 850 to the destination host. In acknowledgement, the destination host sends "resume started" message 860. Once the source host receives "resume started" message 860, it can no longer resume the migrated VM, but otherwise source host 805 can resume the VM. Up until the time that it receives "resume started" message 860, the source host could decide to abort a VM migration process for example, if the destination host stopped responding to the source host.

It is possible that the destination host sends "resume started" message 860 but the source host never sees it. In this case both source host 805 and destination host 810 may try to resume the same VM. In order to guarantee that only one machine will resume the VM, an atomic on-disk lock for each virtual disk that is used by a VM arbitrates between the two machines.

In step 855, all virtual computing tasks and processors begin execution where they left off. In addition, any pending interrupts for things such as disk 10 completions that occurred while the VM was quiesced are be delivered to the guest operating system (GOS) to be delivered to the VM that was migrated.

Step 880 occurs after step 855. During step 880, the VM is executing on the destination host.

In some embodiments, both the source host and the target host have access to the same disk storage, such as shared storage 210 as shown in FIG. 2, and thus disk files need not be copied. In other embodiments, step 835 further includes sending disk files to a storage unit that is available to the target host.

In some embodiments, during step 855 source host 805 sends any remaining memory state of the migrated VM as needed. In such embodiments, any accesses to memory pages that are missing on target host 810 are handled as page faults 865 that are to be paged in from source host 805 via response messages 875.

In other embodiments, during step 855 source host 805 sends all of the VMs remaining memory state to destination host 810. This removes the dependency of the migrated VM on source host 805. The migrated VM is more robust if all information is transferred from the source host to the destination host, because in that case the migrated VM is not impacted by failures or performance issues on source host 805.

In yet other embodiments, source host 805 does both, that is, it gives higher priority to sending pages needed to complete page faults and lower priority to sending all remaining pages.

Unlike the embodiment of VM migration process 240 as shown in FIG. 8, some embodiments use computing task migration techniques that are not based on virtual machines. See for example Osman et al. cited herein in the description of FIG. 2.

In various embodiments, the steps of VM migration process 240 may be reordered, combined with each other, and/or altered in other ways, as known to those skilled in the art.

In some embodiments, VM migration takes a running virtual machine and moves it from one physical machine to another in a way that is transparent to the guest operating system, applications running on the operating system, and remote clients of the virtual machine. The only perceived change should be a brief slowdown during the VM migration and a possible improvement in performance after the migration because the VM was moved to a destination host with more available CPU, disk, or network bandwidth. In general in order for a migration to be transparent, a migrated virtual machine can be unavailable for only a short time while being migrated. Thus, it may be necessary to pre-allocate to the VM migration any of all of: i) source host processor time; ii) destination host processor time; or iii) network bandwidth.

In other embodiments, VM migration is allowed to compete with computing tasks from other VMs and from the VM kernel. These embodiments may be appropriate for a VM for which a relatively long pause in its availability is not an issue, or for a situation in which the VM being migrated has low priority on computing workload relative to the other activities currently going on. In these embodiments, the VM migration will have less impact on the computing workload on the source host and on the destination host.

In yet other embodiments, a VM is quiesced, then its memory state and non-memory state information is written from the source host to a shared disk memory. When resources are available on the destination machine, the state information of the VM is read from the shared disk memory to the destination host, and then the VM is resumed on the destination host. In these embodiments, the VM migration will have even less impact on the computing workload on the source host and on the destination host, partly because the bandwidth of information transfer to and from a shared disk is likely to be significantly lower than via a network. Generally, the bandwidth of a network transfer of information directly from host nation host is higher than the bandwidth of two transfers—first from the source host to a disk, and second from the disk to the destination host. Again, these embodiments may be appropriate for a VM for which a relatively long pause in its availability is not an issue, or for a situation in which the VM being migrated has low priority on computing workload relative to the other activities currently going on.

The inventor has discovered various embodiments that balance a computing workload, as described herein. Some embodiments help solve the problem, in modern multiprocessor systems, of migrating computing tasks without first allowing performance to be compromised on the source host from which computing tasks will be off-loaded. Various embodiments may advantageously increase overall performance of a multiprocessor system by proactively migrating computing tasks based on predicted workloads.

A variety of specific qualities, quantities, sizes, and parametric values have been specified herein. It will be clear to those skilled in the art that these and other attributes can be varied widely without departing from the spirit or the scope of the present invention. Examples include, but are not limited to: i) using a longer or shorter time period for measured workload 305 and time period 310; ii) using various day categories, for example, categorizing Monday through Friday as a first day category, Saturday as a second, Sunday as a third, and holidays as a fourth day category; and iii) using ANNs with varying numbers of nodes, varying numbers of intermediate layers.

Although the present invention has been described in terms of specific embodiments, it is anticipated that alterations and modifications thereof will no doubt become apparent to those skilled in the art. It is therefore intended that the following claims be interpreted as covering all such alterations and modifications (for example, structural, functional, usage, parametric and other changes) as falling within the true spirit and scope of the invention.

What is claimed is:

1. A method of balancing a computing workload, where the method is computer implemented and is adapted for use with at least two hosts that are configured to migrate computing tasks among themselves, the method comprising:
   training a first artificial neural network (ANN), where training data for the ANN is based on a distribution over time of a computing workload for a particular one of the hosts;
   predicting a predicted workload for the particular host when the method is operating in a prediction mode, where the predicting is performed by the first ANN; and
   sending an indication to at least one of the hosts to migrate at least one of the computing tasks away from the particular host, when the method is operating in a proactive mode and when the predicted workload is outside of a proactive operating range for the particular host.

2. The method of claim 1, where the indication includes, when the predicted workload is less than a low proactive threshold, a reduce power flag indicating that all computing tasks currently active on the particular host are to be migrated away from the particular host and then a reduced power mode is to be set for the particular host.

3. The method of claim 1, where the indication includes, when the predicted workload is greater than a high proactive threshold, an offload flag indicating that at least one computing task currently active on the particular host is to be migrated away from the particular host.

4. The method of claim 1, further comprising:
   monitoring the computing workload for the particular host; and
   automatically switching the method to the proactive mode, when a difference between the monitored workload and the predicted workload is less than an autostart accuracy threshold.

5. The method of claim 1, further comprising:
   monitoring the computing workload for the particular host; and
   sending an indication to at least one of the hosts to migrate computing tasks away from the particular host, when the method is operating in a the reactive mode and when the monitored workload is outside of the reactive operating range for the particular host.

6. The method of claim 1, further comprising:
   monitoring the computing workload for the particular host; and automatically switching the method to a reactive mode, when the monitored workload is outside of a failsafe operating range for the particular host.

7. The method of claim 6, further comprising:
automatically switching the first ANN to the training mode, when the monitored workload is outside of the failsafe operating range for the particular host.

8. The method of claim 1, further comprising:
displaying to a user any combination of infoiuiation selected from: i) a set of configuration settings for the method; ii) a monitored workload of the particular host over a period of time; or iii) the predicted workload for the particular host over the same period of time; and
optionally receiving from the user one or more new values for the configuration settings.

9. The method of claim 8, where the configuration settings include one or more selected from: a command for the ANN to enter a training mode; a command for the ANN to enter a predict only mode; a command to enter the proactive mode; a command to enter a reactive mode; a command to enter an autostart mode; a command to stay in a current mode; a command to disable automatic migration of a particular computing task; a command to require that at least two computing tasks be migrated together whenever any one of them is migrated; a priority for migration processes versus other computing tasks; a command to set an autostart accuracy threshold; a command to set a failsafe operating range; a command to set a proactive accuracy range; a command to set a reactive accuracy range; a command that applies to a category of days; or a command that applies to all days.

10. The method of claim 1, where the computing workload is selected from one or more of: i) a processor utilization indication; ii) a memory utilization indication; or iii) an input output (IO) utilization indication.

11. The method of claim 1, where the distribution over time of the computing workload is selected from one or more of: i) a distribution based on a time of day; or ii) a distribution based both on a time of day and on a day category.

12. The method of claim 1, further comprising:
training a second artificial neural network (ANN), where training data for the ANN is based on a distribution over time of a computing workload for a particular one of the hosts, and where the training data only includes computing workload information for days within a second day category;
where the training data for the first ANN only includes computing workload information within a first day category; and
where the predicting is performed by the first ANN when a current day is within the first day category and is performed by the second ANN when the current day is within the second day category.

13. The method of claim 1, where the at least one of the computing tasks to be migrated is executed by an operating system and where the migration also includes:
the operating system;
a memory image of the particular computing task;
a control state for any IO devices in use by the particular computing task; and
a processor state for the particular computing task.

14. The method of claim 13, where the computing task, the operating system, the memory image, the disk image, the control state, and the processor state form a virtual machine.

15. A non-transitory computer-readable medium that stores a sequence of instructions that, when read from the medium and processed by the computer, control the performance of a method for balancing a computing workload, where the method is adapted for use with at least two hosts that are configured to migrate computing tasks among themselves, and where the method comprises:
training a first artificial neural network (ANN), where training data for the ANN is based on a distribution over time of a computing workload for a particular one of the hosts;
predicting a predicted workload for the particular host when the method is operating in a prediction mode, where the predicting is performed by the first ANN; and
sending an indication to at least one of the hosts to migrate at least one of the computing tasks away from the particular host, when the method is operating in a proactive mode and when the predicted workload is outside of a proactive operating range for the particular host.

16. The non-transitory computer-readable medium of claim 15, where the indication includes, when the predicted workload is less than a low proactive threshold, a reduce power flag indicating that all computing tasks currently active on the particular host are to be migrated away from the particular host and then a reduced power mode is to be set for the particular host.

17. The non-transitory computer-readable medium of claim 15, where the indication includes, when the predicted workload is greater than a high proactive threshold, an offload flag indicating that at least one computing task currently active on the particular host is to be migrated away from the particular host.

18. The non-transitory computer-readable medium of claim 15, where the method further comprises:
monitoring the computing workload for the particular host; and
automatically switching the method to the proactive mode, when a difference between the monitored workload and the predicted workload is less than an autostart accuracy threshold.

19. The non-transitory computer-readable medium of claim 15, where the method further comprises:
monitoring the computing workload for the particular host; and
sending an indication to at least one of the hosts to migrate computing tasks away from the particular host, when the method is operating in a the reactive mode and when the monitored workload is outside of the reactive operating range for the particular host.

20. The non-transitory computer-readable medium of claim 15, where the method further comprises:
monitoring the computing workload for the particular host; and
automatically switching the method to a reactive mode, when the monitored workload is outside of a failsafe operating range for the particular host.

21. The non-transitory computer-readable medium of claim 20, where the method further comprises:
automatically switching the first ANN to the training mode, when the monitored workload is outside of the failsafe operating range for the particular host.

22. The non-transitory computer-readable medium of claim 15, where the method further comprises:
displaying to a user any combination of information selected from: i) a set of configuration settings for the method; ii) a monitored workload of the particular host over a period of time; or iii) the predicted workload for the particular host over the same period of time; and
optionally receiving from the user one or more new values for the configuration settings.

23. The non-transitory computer-readable medium of claim 22, where the configuration settings include one or more selected from: a command for the ANN to enter a training mode; a command for the ANN to enter a predict only mode; a command to enter the proactive mode; a command to enter a reactive mode; a command to enter an autostart mode; a command to stay in a current mode; a command to disable automatic migration of a particular computing task; a command to require that at least two computing tasks be migrated together whenever any one of them is migrated; a priority for migration processes versus other computing tasks; a command to set an autostart accuracy threshold; a command to set a failsafe operating range; a command to set a proactive accuracy range; a command to set a reactive accuracy range; a command that applies to a category of days; or a command that applies to all days.

24. The non-transitory computer-readable medium of claim 15, where the computing workload is selected from one or more of: i) a processor utilization indication; ii) a memory utilization indication; or iii) an input output (IO) utilization indication.

25. The non-transitory computer-readable medium of claim 15, where the distribution over time of the computing workload is selected from one or more of: i) a distribution based on a time of day; or ii) a distribution based both on a time of day and on a day category.

26. The non-transitory computer-readable medium of claim 15, where the method farther comprises:
training a second artificial neural network (ANN), where training data for the ANN is based on a distribution over time of a computing workload for a particular one of the hosts, and where the training data only includes computing workload information for days within a second day category;
where the training data for the first ANN only includes computing workload information within a first day category; and
where the predicting is performed by the first ANN when a current day is within the first day category and is performed by the second ANN when the current day is within the second day category.

27. The non-transitory computer-readable medium of claim 15 where the at least one of the computing tasks to be migrated is executed by an operating system and where the migration also includes:
the operating system;
a memory image of the particular computing task;
a control state for any IO devices in use by the particular computing task; and
a processor state for the particular computing task.

28. The non-transitory computer-readable medium of claim 27, where the computing task, the operating system, the memory image, the disk image, the control state, and the processor state form a virtual machine.

29. A system for balancing a computing workload, where the system is adapted for use with at least two hosts that are configured to migrate computing tasks among themselves, the system comprising:
an artificial neural network (ANN), configured to process training data that is based on a distribution over time of a computing workload for a particular one of the hosts, and configured to predict a predicted workload for the particular host when the system is operating in a prediction mode, where the particular host has a proactive operating range; and
a workload controller configured to send an indication to the hosts to migrate at least one of the computing tasks away from the particular host, when the system is operating in a proactive mode and when the predicted workload is outside of the proactive operating range.

30. A system adapted for use with a host means operable to migrate computing tasks among particular hosts within the host means, the system comprising:
artificial neural network (ANN) means for training, when operating in a training mode, where training data for the ANN is based on a distribution over time of a computing workload for a particular one of the hosts within the host means, and where the ANN means is further a means for predicting, when operating in a prediction mode, a predicted workload for the particular host means; and
control means for sending, when operating in a proactive mode, an indication to the host means to migrate at least one virtual machine (VM) away from the particular host when the predicted workload is outside of a proactive operating range for the particular host means.

31. The system of claim 30, further comprising:
means for monitoring the computing workload for the particular host means; and
means for automatically switching the control means to the proactive mode, when a difference between the monitored workload and the predicted workload is less than an autostart accuracy threshold.

32. The system of claim 30, further comprising:
means for monitoring the computing workload for the particular host;
where the control means is further a means for automatically switching to a reactive mode, when the monitored computing workload is outside of a proactive operating range for the particular host, where when in the reactive mode the control means signals the host means to migrate at least one VM away from the particular host based on the monitored workload.

33. The system of claim 32, where the control means is further a means for switching the ANN to the training mode, when the monitored computing workload is outside of a proactive operating range for the particular host means.

34. The system of claim 30, where the VM also includes:
a memory image for the particular computing task;
a disk image for the particular computing task; and
a control state for any IO devices in use by the particular computing task.

35. The system of claim 34, where at least a substantial part of the memory image within the VM is migrated to a destination host means prior to ending execution of the VM on the particular host means.

* * * * *